Oct. 19, 1937.  H. J. MURRAY  2,096,645

AUTOMATIC CLUTCH SYNCHRONIZER

Filed Jan. 23, 1923

INVENTOR
Howard J. Murray
BY
Warren S. Orton
ATTORNEYS

Patented Oct. 19, 1937

2,096,645

UNITED STATES PATENT OFFICE 2,096,645

AUTOMATIC CLUTCH SYNCHRONIZER

Howard J. Murray, Brooklyn, N. Y., assignor, by mesne assignments, to Sure Shift Transmission Corporation, Pittsburgh, Pa., a corporation of Delaware Application January 23, 1923, Serial No. 614,502

32 Claims. (Cl. 74—339)

The invention relates in general to a synchronizer for causing two rotating power members, generally designated as rotors, to tend to approach the same speed and in its relation to one specific situation in which the invention is applicable, it relates to a variable speed power transmission mechanism of the gear shift type and in which the power driven and the load carrying gears are coordinated through the inter-position of a clutch so that these power gears will tend to approach or assume a speed of rotation equal to each other before the power gears are moved into meshed position. The invention in its application to its use herein featured specifically relates to that type of gear synchronizing mechanism in which the actuation of a single, manually-operated control member moving in one direction causes the gears to be connected initially through the medium of a clutch and the continued movement of which control member will cause an intermeshing of the power gears in their direct driving relation.

The present application constitutes one of a series of pending applications and constitutes another embodiment of the invention disclosed in U. S. Patent No. 1,849,721, Power transmission mechanism, filed March 30, 1922; U. S. Patent No. 1,764,334, Sliding clutch gear synchronizer, filed March 30, 1922; U. S. Patent No. 1,511,232, Clutch ring synchronizing device, filed March 30, 1922; U. S. Patent No. 1,502,345, gear synchronizer, filed August 16, 1922 and Serial No. 601,689, filed November 18, 1922, Double clutch synchronizers.

In Patent No. 1,849,721 the specific form of clutch selected for illustration is of the friction type including an internal band with concentrically disposed clutching members and in which the clutching movement takes place radially of the axis of rotation of the intermeshing gears. In Patent No. 1,764,334 there is illustrated a different form of friction clutch in which the movable element is shiftable to and from its clutching engagement with one of the power gears in a direction axially of the shaft which carries the same. In Patent No. 1,502,345 there is illustrated a spring resisted, mechanical clutching connection between the synchronizing gear and the power gear upon which it was slidably and rotatably mounted. In Patent No. 1,764,333 there is featured an improvement in the friction clutch element of the synchronizer resulting in a more efficient clutching operation with less manual force than could be obtained by the devices disclosed in the prior applications.

The present disclosure features a simplification of means for insuring the proper meshing of the synchronizing gear with the co-related power gear without danger of stripping the teeth of either gears, and in general features the same advantages such as simplicity in structural design; ease of control in operating the same; positiveness of actuation and ready substitution of the corresponding gear unit in transmission casing of conventional structure, as is featured in the above identified companion applications.

It is appreciated that the effectiveness of any form of gear synchronizer which depends upon a friction clutch for its efficiency must have available a clutching force capable of resisting the momentum of the gears in their tendency to resist being brought to the same speed. It is a usual practice to supply this braking force by the manual effort of the operator but this force obviously is limited and even when supplied by a powerful man is apt to be weak under the stress of sudden action. In certain cases where the turning torque of the gears and their associated parts are high, such for instance as the shift gears in a transmission of a motor vehicle travelling at high speed, there is not available sufficient manual force to effect a quick shift even when the available manual force is powerful.

Accordingly, the primary object of the present invention is to provide a synchronizer of the friction type, which may be selectively started by a relatively weak controlling force, either manual or mechanical, and the real actuating force necessary to cause a prompt, effective interengaging of the friction clutching faces will be supplied from a source external to the synchronizer and of course independent of the energy of the manual or other controlling agency.

Gears are usually shifted into intermeshing relation when one or both of the related gears and their associated parts are rotating and there is thus available a source of energy ample to supply the necessary power to actuate the synchronizer.

The invention herein disclosed, features the utilization of the power available in the relative rotary movement of the gears for the purpose of effecting the synchronizing of the gears, and, incidentally there is featured the elimination of any necessity of using manual force to supply the necessary work to overcome the inertia of the gears.

Differently stated, another object of the invention is to provide a simple form of friction clutch synchronizer in which a relatively weak controlling force brings into operation a relatively powerful force capable of causing the synchronizer to function effectively and which powerful force will be proportional to the work necessary to be done to effect the synchronizing action.

Various other objects and advantages of the invention will be in part obvious from an inspection of the accompanying drawing and in part will be more fully set forth in the following particular description of one form of mechanism embodying my invention, and the invention also consists in certain new and novel features of construction and combination of parts hereinafter set forth and claimed.

Figure 1:
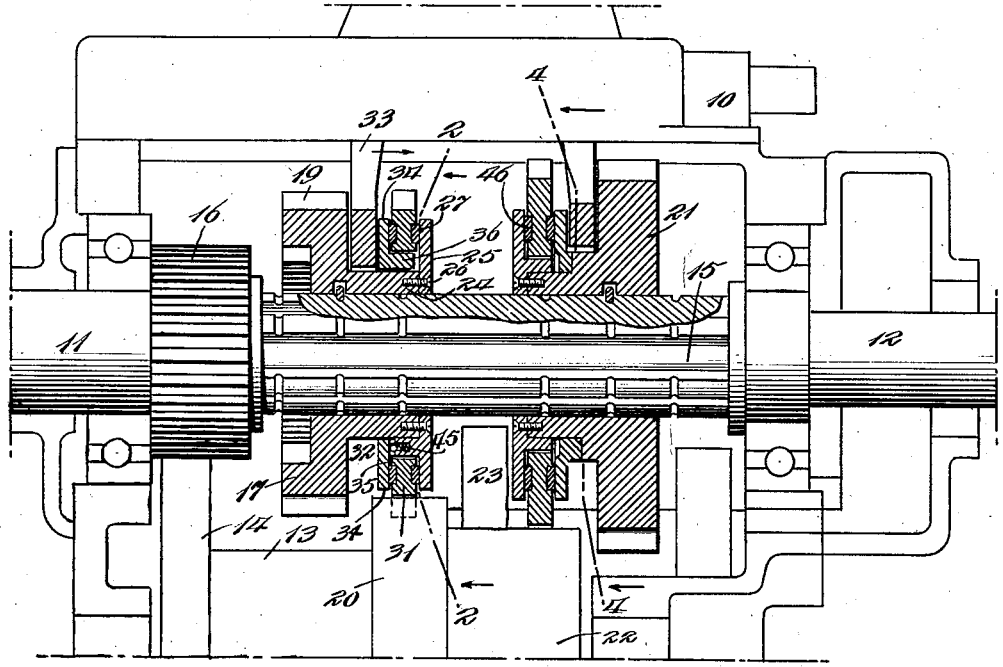
Figure 1 is a vertical sectional view taken axially of the power shafts through a transmission casing of conventional form, equipped with a preferred embodiment of the inventive features disclosed in this and in the above identified applications.
Figure 4:
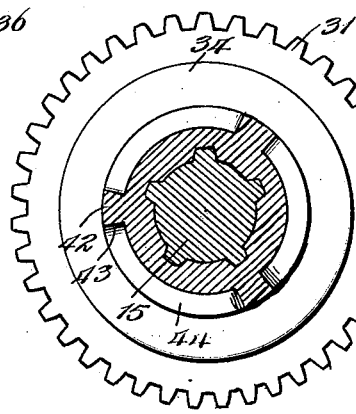
Figure 5:

Figures 4 and 5 are views of a modified form shown in axial section at the right of Figure 1 and of which Figure 4 is a transverse sectional view taken on the line 4—4 of Figures 1 and 5; and Figure 5 is a view in side elevation of the synchronizer and associated parts used in Figure 1 to control the first and reverse speeds.

In the drawing there is shown a containing casing 10 for housing the several parts and for providing bearings for the several shafts and shift rods entering therein. Further for the purpose of showing the applicability of this invention to an automobile engine construction it will be considered that the shaft 11 is a power shaft operatively connected with the engine shaft of an automobile and that the shaft 12 is a propeller shaft operatively connected to drive the traction wheels of an automobile.

The propeller shaft projects into the casing in alignment with the power shaft and has certain portions thereof non-circular in cross-section to accommodate the combined sliding gear and clutch units hereinafter described. A counter-shaft 13 provided with a main drive gear 14 adjacent one end is rotatably mounted within the casing and parallels the encased non-circular portion 15 of the propeller shaft. The gear 14 is constantly in mesh with a main driving gear 16 fixed to the power shaft 11 so that the counter-shaft is constantly connected to be driven from or to drive the power shaft. A sliding gear unit 17 is keyed to the shaft 15 so as to rotate therewith, and is designed to mesh with the gear 16 to provide a direct drive between the shafts 11 and 12.

The gear unit 17 is provided with external teeth 19 hereinafter referred to as a rotor or driven gear and adapted, when meshed with a gear 20 keyed to the counter-shaft and hereinafter referred to generically as a rotor and specifically as a driving gear, to obtain second speed. Another gear 21 keyed to and slidably mounted on the shaft portion 15 is designed in one shifted position to mesh with a gear 22 on the counter-shaft to obtain first speed and in another shifted position to mesh with an intermediate gear 23 to obtain reversed speed.

In the following description particular reference will be made to the synchronizing of gears 19 and 20 but it will be understood that the invention with obvious mechanical changes can be adapted for use in other locations and as an illustration of one such use reference is made to the first speed and reverse speed synchronizing arrangement shown at the right side of Figure 1. The shiftable gear unit herein illustrated is provided with a reduced sleeve extension 24 which constitutes a hub providing a circular bearing for the synchronizer. An end plate 25 is secured to the end of the hub by means of screws 26. The end plate is provided on the side facing the hub with a radially extending bearing face 27 designed to constitute one element of a friction clutch of the side face type.

The hub 24 is encircled by the synchronizer herein featured and this synchronizer includes a synchronizer gear 31 mounted when free of the clutch for rotary movement about the axis of the shaft part 15 and free to slide for a limited movement axially to and from its clutching engagement with the friction face 27. The hub portion 24 also carries a follower or follower plate 34 which is free to have slight axial movement to and from the adjacent face 35 of the synchronizing gear 31 and has a slight freedom of rotary movement relative to the stop plate 25 and its associated gear unit 17. The space between the follower and the gear proper provides a peripheral groove 32 into which extends a yoke fork 33 actuated from a control rod as is usual in similar constructions of transmission casings. From this construction it will be understood that the movement of the yoke fork or arm 33 from left to right as indicated by the arrow will cause the follower plate to bear against the synchronizing gear and in turn to cause the synchronizing gear to bear against the fixed stop provided by the end plate 25.

Figure 2:
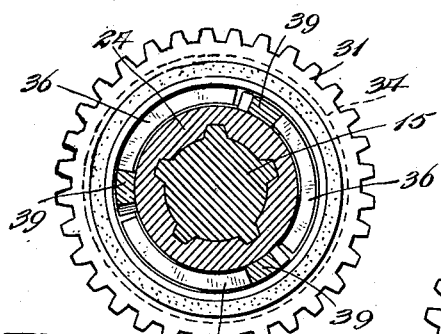
Figure 2 is a transverse sectional view through the synchronizing device taken on the line 2—2 of Figures 1 and 3 looking in the direction indicated by the arrows.
Figure 3:
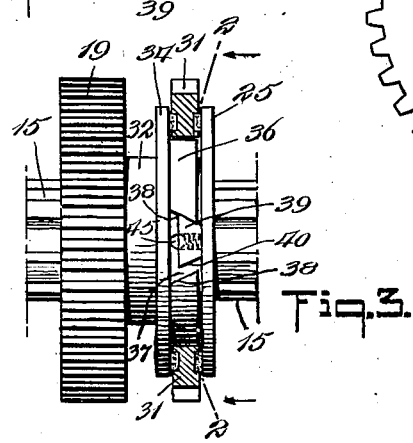
Figure 3 is a view in side elevation and with parts broken away of the form of the synchronizer shown at the left of Figure 1.

The follower includes a hub 36 in the form of a collar which provides on its outer periphery a bearing for the synchronizer gear 31, which is free to rotate on the collar. The sleeve is interrupted at a plurality of points, (shown to be three in Figure 2) to provide dovetail recesses 37 outlined on opposite sides by wedge surfaces 38 converging towards the end plate 25 and each forming an angle of approximately 45° with a plane containing the axis of rotation as shown in Figure 3.

A plurality of similarly shaped dovetail projections 39, one for each recess project from the side of the plate 25 towards the follower and fit loosely in the recesses. The projections are each of less length considered circumferentially than the corresponding dimension of the recess in which it moves so that there is a limited freedom of rotary movement between the stop plate and the collar. The advance and rear sides of each projection are formed of converging sides 40 coacting with the adjacent surfaces 38 to form a wedging action between the fixed end plate 25 and the follower 34 and operating to resolve the torque due to the relative rotary speed of the unit 17 and gear 20 into a component acting in an axial direction to shift the follower, either towards the stop plate or opposite direction, depending on the direction of rotation of the unit 17.

Referring to the modified form of the wedge shifting element shown at the right of Figure 1 and in Figures 4 and 5, it will be seen that a shoulder 41 on the gear 21 is provided on the edge facing the follower 34 with a flat, wide spreading V-shaped projection 42 corresponding to the dove-tail projection 39 in the preferred showing. This projection 42 fits loosely in a similarly shaped recess 43 formed on the hub sleeve 44 forming part of the follower 34.

In order to prevent any accidental freezing of the clutch surfaces when free of the holding action of the control lever 33, it is suggested that means be provided to insure or at least assist the restoration of the shiftable element of the clutch into its normal inoperative position. For this purpose there is shown a spring pressed ball plunger 45, carried by each of the projections 39 and bearing on the follower plate 34 to shift the same out of engagement with the synchronizer gear or rather to release the pressure of the follower on the gear 31.

In operation and assuming that it is desired to move the gears 19 and 20 from their unmeshed positions shown in Figure 1 into their fully meshed position, as is usual in providing for second speed drives, the control is shifted so as to move the yoke 33 to the right from the position illustrated. The initial movement of the control lever acts to shift the follower into bearing engagement with the synchronizer and in this way provides a clutching engagement between the adjacent or front side of the synchronizer gear and the follower plate. The continued application of pressure against the side of the synchronizing gear will cause the same to move into frictional engagement with the fixed stop plate. In this way the advanced side of the synchronizer gear will be in direct clutching engagement with the gear unit 17.

Irrespective as to whether or not the force applied to the lever 33 is sufficient to shift the synchronizer gear into bearing engagement with the stop plate 25, any force will be sufficient to retard whatever rotary movement may be possessed by the relatively light follower 34, and there will be a resulting tendency of the follower to stop or at least to retard its rotary movement, if it should happen to be moving at the instant the shift lever 33 is actuated. However, the stop plate 25, together with the entire massive unit 17, is rotating with a powerful torque from the shaft 12. The rotation of the dove-tail projections 39 in either direction will cause the faces on the advance sides to bear simultaneously at circumferentially spaced apart points on the advance faces outlining the recesses in the collar and due to the angle between the coacting faces the powerful effect of the turning unit will act to shift the follower axially into a firm clutching engagement with the synchronizer gear and in turn will cause this gear to bear firmly against the stop plate and thus attain the double clutching action featured in Serial No. 601,689. It is understood that the clutching of the synchronizer gear to the gear unit provides a driving connection between the shaft 12 and the jack shaft gear 20 so as to cause the shafts 11 and 12 to approach the same speed just prior to the movement of the teeth of the gear 19 into meshing engagement with the teeth of the gear 20, all as has been more fully described in the companion applications.

In the form shown in Figures 4 and 5, the power inherent in the rotating gear unit 21 will cause the projection to bear against the inclined edge of the recess 43 and similarly shift the follower 34 into clutching engagement with the synchronizer gear 31 as previously described.

As there is available ample power to effect any necessary clutching action in the friction clutch it is possible to use a more durable friction surface between the clutch parts than has been possible in the devices shown in the prior applications and it is herein suggested that the synchronizer and its contacting parts be made entirely of metal or, as shown in the preferred form herein illustrated metallic rings 46 may be inset in opposite faces of the synchronizer gear 31.

Considering any set of unmeshed gears which is about to be moved into intermeshing relation, it is understood that in the case of the automotive power transmission gear herein disclosed, both of the gears rotate in the same direction, but usually one is rotating faster than the other. This relative difference of speed can be expressed in terms of energy if the various factors present are known. This energy of course must be overcome in order to change the status of the gears in the act of causing them to approach the same speed. In the present disclosure it is apparent that the energy inherent in this relative rotary speed of the gear and their associated parts, is sufficient to supply, or practically supply, all of the energy necessary to bring the gears to the same speed and the necessity of supplying any material pressure on the shifting lever by manual power or by other means has been eliminated. Differently stated, the manual or other governing power need be of sufficient value merely to effect a drag of the follower so as to permit the torque possessing unit to move into engagement therewith and thus cause the camming reaction to supply the real power necessary to effect the clutching operation. A small manual pressure on the shift lever is ample to control or relay the greater energy or momentum available in the gear parts about to be meshed.

The device is inherently automatic because the greater the relative speed, the greater is the available energy and the greater the power available to effect the synchronizing of the gears. When the gears are at the same speed, there is of course no available energy, but at this time there is no need of synchronizing. The energy disappears when synchronism occurs and the device therefore features efficiency in use of power necessary to effect synchronization.

By means of a device of this character, it is possible to shift gears into intermeshing relation without danger of stripping teeth or developing any jarring action, and this is attained without necessity of employing any material manual effort and ample power is always available irrespective of the inertia of the gears about to be meshed.

Having thus described my invention, I claim:

1. In a gear transmission, the combination of a shaft, a gear unit slidably keyed to said shaft and including a stop element, a synchronizer carried by the unit and free to rotate thereon, said synchronizer including a follower having a sleeve journalled for rotation on the unit, a synchronizer gear journalled for rotary movement on the sleeve and adapted to be clutched between the follower and the stop element, said sleeve provided on the edge facing the stop element with a plurality of recesses having converging advance and rear walls inclined to a plane passing through the axis of rotation of the shaft and said stop element provided with a plurality of projections having similarly inclined converging walls and coacting to cause the follower to bear on the synchronizer gear in the event that the projection carrying unit tends to overrun the follower in its rotary movement and a spring pressed plunger tending normally to restore the follower to an inoperative, non-clutching relation with the synchronizer gear.

2. In a gear transmission, the combination of a shaft, a gear unit slidably keyed to said shaft and including a stop element, a synchronizer carried by the unit and free to rotate thereon, said synchronizer including a follower having a sleeve journalled for rotation on the unit, a synchronizer gear journalled for rotary movement on the sleeve, and adapted to be clutched between the follower and the stop element, said sleeve provided on the edge facing the stop element with a plurality of recesses having converging advance and rear walls inclined to a plane passing through the axis of rotation of the shaft and said stop element provided with a plurality of projections having similarly inclined converging walls and coacting to cause the follower to bear on the synchronizer gear in the event that the projection carrying unit tends to overrun the follower in its rotary movement.

3. In a device of the class described, the combination of a rotating unit provided with a stop element of a friction clutch, said element having a dove-tail extension projecting axially thereof, a follower mounted on the unit and having a limited freedom of rotary movement relative to the stop element, said follower provided with a dove-tail shaped recess containing said projection and a synchronizer gear journalled for free rotary movement between the follower and stop and clutched therebetween by the wedging action of the projection acting circumferentially on the wall outlining the recess in the follower.

4. In a gear synchronizer, the combination of a pair of gears adapted to be shifted into a driving relation, a synchronizer for causing the gears to approach the same speed prior to moving into said driving relation, control means for inaugurating the action of said synchronizer means energized by the momentum of one of the gears for completing the action of the synchronizer and means controlled by the continued movement of the control means for causing the synchronizer to become inoperative following its synchronizing action.

5. In a gear synchronizer, the combination of a pair of gears adapted to be shifted into a driving relation, a synchronizer for causing the gears to approach the same speed prior to moving into said driving relation, control means for inaugurating the action of said synchronizer and means energized by the momentum of one of the gears for completing the action of the synchronizer.

6. In a gear synchronizer, the combination of a pair of gears adapted to be shifted into a driving relation, a synchronizer for causing the gears to approach the same speed prior to moving into said driving relation, means controlled by the momentum of one of the gears for causing the synchronizer to function, and means for automatically causing said synchronizer to become inoperative following its synchronizing action on the pair of gears.

7. In a gear synchronizer, the combination of a pair of gears adapted to be shifted into a driving relation, a synchronizer for causing the gears to approach the same speed prior to moving into said driving relation and means controlled by the momentum of one of the gears for causing the synchronizer to function.

8. In a device of the class described, the combination of two gears adapted to be synchronized before being moved into intermeshed position, one of said gears constituting a support provided with a stop element of a friction clutch, a follower slidable axially on the support and having a limited freedom of rotary movement in relation to the stop element, a synchronizer element disposed between the follower and stop element and adapted to be clutched thereby, and camming means between the support and the follower for causing a rotation of the follower to shift the same axially and into clutching engagement with the synchronizer element.

9. In a device of the class described, the combination of a shaft, a power gear keyed thereto, a synchronizer gear journalled for rotary movement on the power gear, a friction clutch for securing the synchronizer gear to the power gear, a cam connection between the shiftable element of the clutch and the power gear and means for retarding the free rotary movement of the shiftable clutch element to cause the clutch to function.

10. In a synchronizing device, the combination of one of two gears to be meshed, said gear constituting a relatively fixed member and a relatively movable member carried by said gear and coacting with the same to form part of a clutch, both members mounted for rotary movement about a common axis, and the movable member shiftable axially relative to the fixed member to effect a clutching relation with the fixed member, and means controlled by the relative rotary movement of said members for resolving the rotary torque of one of the members into an axial movement of the movable member thereby to effect the clutching action from the power of said rotating member.

11. In a device of the class described, the combination of a pair of rotors, a synchronizer for causing the rotors to approach a common speed, said synchronizer provided with means for positively engaging one of said rotors to turn therewith and provided with clutching means for effecting a frictional engagement with the other rotor, and camming means between the synchronizer and one of the rotors for translating the rotary movement of said rotor into a shifting movement of said synchronizer into its clutching position whereby the power necessary to effect the clutching action of the synchronizer is derived from the rotary motion of said rotor.

12. In a gear synchronizer, the combination of a pair of gears adapted to be shifted into a driving relation, a synchronizer including a friction clutch for causing the gears to approach the same speed prior to moving into said driving relation, said synchronizer being normally free to move relative to and adapted to be connected to one of the gears and synchronizer actuating means operatively controlled by the momentum of said gear to cause the synchronizer clutch to effect a friction clutching engagement between the gears.

13. In a device of the class described, the combination of a pair of gears, means for causing said gears to approach the same speed prior to moving into a meshing relation, said means including a clutch, and means for shifting the clutch into operative position, said means being operatively connected to be actuated by the relative rotary movement of the gears.

14. In a synchronizing device, the combination of means for synchronizing the speed of a pair of rotating members, said synchronizing means including a friction clutch including a shiftable mechanism provided with a connecting force transmitting element adapted to be operatively connected at will to one of the members to be synchronized and actuated by the power from such member and control means for placing said element in operative engagement with said member.

15. In a gear synchronizer, the combination of a pair of gears adapted to be shifted into a driving relation, a synchronizer for causing the gears to approach the same speed prior to moving into said driving relation, a control responsive to a relatively light force for causing the synchronizer to begin to function and means for causing the synchronizer to complete the synchronizing of the gears independently of the operativeness of said control inaugurating the action of the synchronizer.

16. In a gear synchronizer, the combination of a pair of gears adapted to be shifted into a driving relation, a synchronizer for causing the gears to approach the same speed prior to moving into said driving relation, a control responsive to a relatively light force for causing the synchronizer to begin to function and means actuated by the force of the gears about to be meshed for causing the synchronizer to complete the synchronizing of the gears.

17. In a device of the class described, the combination with a pair of gears, one of which is capable of possessing a relatively high torque force, means including an actuating clutch for synchronizing the gears, shifting means for effecting a powerful actuation of said clutch, said shifting means including a power multiplying mechanism adapted to be operatively connected to the high torque gear to cause the same to react with a power multiplying effect on the clutch and to act therethrough to cause said synchronizing means to function.

18. A synchronizer for causing a pair of power gears to approach the same speed before being moved into meshing relation, said synchronizer including actuating means adapted to be operatively connected to one of the power gears to be synchronized and supplied by said power gear with the energy necessary to effect an actuation of said synchronizer and a manual control for governing the operative relation of said means with the power gear.

19. In a gear synchronizer, the combination of means for causing gears to approach the same speed prior to being moved into intermeshing relation, said means including a friction clutch having elements operatively connected to be actuated by the rotation of one of the gears relative to the other, and the clutching faces of said clutch being formed of metal.

20. In combination, a pair of members capable of having relative rotary movement about a common axis, synchronizing means for causing the members to approach a common speed, said means including a clutch for frictionally connecting said members through said synchronizing means and thus cause them to approach the same speed, said clutch including a shiftable element movable parallel to said axis manually actuated means for shifting the movable clutch element into a relatively light clutching condition, and camming means connected to be operably responsive to any subsequent relative movement of said members when in said clutching position for shifting said clutch element axially into a more intense clutching position and thus cause the clutch to function by virtue of the relative movement of said members.

21. In a synchronizing device the combination of a pair of members mounted for relative rotary movement about a common axis and adapted to turn independently of each other, one of said members being relatively massive and the other being relatively light in weight, said members provided with engaging surfaces coacting to provide a friction clutch therebetween, a follower plate for shifting said light member axially into its frictional engagement with the massive member, a manually actuated member for shifting said plate to cause a frictional engagement between the members, said plate and the massive member having adjacent faces fashioned to provide a camming engagement inclined to the plane of rotation of the members and acting to move the light member into its clutching position in the tendency of the turning massive member to overrun the follower plate when in said frictional engagement with the light weight member.

22. In a gear synchronizer, the combination of a spline power shaft, a gear normally free to rotate about said shaft, means slidably mounted on and keyed to the power shaft to rotate therewith, said means including an axially shiftable gear and a relatively light weight ring form of clutch element movable axially of the shaft for clutching the normally free gear to cause the same to turn with the shaft and a manually actuated gear shifting control including a member adapted to bear against one side of the clutch element to shift the same axially into its operative clutching position as the gear keyed to the power shaft is shifted along the shaft.

23. The combination in a power transmission including a pair of shafts, gears on said shafts adapted to establish a drive between the shafts, means including an axially shiftable member for connecting and disconnecting said drive, of synchronizing means for establishing the desired speed relation between the shafts before the drive is connected, said synchronizing means comprising a friction clutch and means for effecting thrust against said clutch to cause its frictional engagement, said means adapted to augment said thrust by the rotation of the gearing, and means for operating the shiftable member and synchronizing means.

24. In a device of the class described, the combination of a support provided with a relatively fixed element of a friction clutch, an actuator slidable axially on the support, means for restraining the rotary movement of the actuator relative to the support, a synchronizer element disposed between the actuator and clutch element and adapted to be clutched therebetween and camming means between the support and the actuator for causing a shifting of the actuator axially and into clutching engagement with the synchronizer element.

25. The combination in a power transmission including a pair of shafts, gears on said shafts adapted to establish a drive between the shafts, of synchronizing means for establishing the desired speed relation between the shafts before the drive is connected, said synchronizing means comprising a friction clutch, means including an axially shiftable member for connecting and disconnecting said drive and for effecting thrust on said clutch to cause its frictional engagement and means operable incidental to the relative rotation of the gears to augment said thrust.

26. The combination in a power transmission including a pair of shafts, gears on said shafts adapted to establish a drive between the shafts, of synchronizing means for establishing the desired speed relation between the shafts before the drive is connected, said synchronizing means comprising a friction element, a coacting friction element normally freely rotatable relative to the first named friction element, said friction elements adapted to be engaged by a relative axial movement, means including an axially shiftable member for connecting and disconnecting said drive, and means operatively responsive to the relative rotary movement of the shafts for imparting a greater axial force to increase the engagement of the synchronizing friction elements than that applied to shift the shiftable member.

27. In a device of the class described, the combination of two gears adapted to be synchronized before being moved into intermeshing position, one of said gears constituting a support provided with a stop element of a friction clutch, a follower slidable axially on the support and having a limited freedom of movement in relation to the stop element, a synchronizer element disposed between the follower and stop element and adapted to be clutched thereby, and camming means between the support and the follower to effect relative rotation thereof to shift the follower axially and into clutching engagement with the synchronizer element.

28. In a torque transmitting drive mechanism for a motor vehicle or the like, a first element mounted for rotation, a second element mounted for rotation on an axis common to said first element, a self-energizing clutch for establishing a frictional driving connection between said elements including a plate ring adapted to rotate with said first element and arranged for limited rotational movement relative thereto, friction facings carried by said second element on opposite sides thereof, said plate ring and said first element each having a surface adapted frictionally to engage said friction facings respectively of said second element when the plate ring is urged axially in the direction of said second element, means for urging said plate ring in the direction of said second element initially to establish frictional driving engagement between said surfaces on said first element and said plate ring and the friction facings respectively on said second element, and cam means associated with said first element and with said plate ring for augmenting force applied to move said plate ring in the direction of said second element in response to torque transmitted through said drive mechanism.

29. In a clutch of the self-energizing type for use in transmitting torque from one part of an automobile drive mechanism to another comprising a first element mounted for rotation, a second element mounted for rotation on the axis of said first element, a plate ring mounted on said first element for axial movement and limited rotational movement relative thereto, a pair of friction facings carried by said second element, one on each of opposite sides thereof, said plate ring and said first element each having opposed surfaces adapted frictionally to engage said friction facings respectively on said second element when the plate ring is urged axially in the direction of said second element, means for urging said plate ring in the direction of said second element whereby to compress said second element between the surfaces on said plate ring and said first element thereby to establish initial frictional driving engagement between said first element and said second element, and cam means associated with said first element and with said plate ring for augmenting force applied to said plate ring by said urging means, said cam means being responsive to relative rotation between said plate ring and said first element.

30. A self-energizing clutch including, in combination, a first element mounted for rotation, a second element mounted for rotation about an axis common to said first element, friction facings carried upon opposite sides of said second element, one of said facings on one side of said second element being in register with a friction facing engaging surface formed on said first element, a plate ring carried by said first element on the opposite side of said second element and movable along the said axis of said first element toward or away from the adjacent friction facing on said second element, said plate ring having a friction facing engaging surface in register with said last named friction facing, means for urging said plate ring along the axis of said first element toward said second element whereby to establish a relatively light frictional driving engagement between the opposed surfaces of said first element and said plate ring and the friction facings carried by said second element, and cam means associated with said first element and with said plate ring arranged upon limited relative rotation between the said first element and said plate ring to urge said plate ring toward said second element into a more intense clutching position.

31. In combination, a power transmitting assembly adapted to rotate as a unit about a fixed axis, a power transmitting member adapted to rotate and having its axis of rotation common with the axis of rotation of said assembly, said assembly including a relatively fixed element formed to provide a friction facing engaging surface perpendicular to said fixed axis and a plate ring mounted for movement along said axis toward and away from said surface and having limited rotational movement relative to said element, said plate ring being formed with a friction facing engaging surface in register with and parallel to said first named surface, said power transmitting member having a circumferential portion located between said registering surfaces of said power transmitting assembly, friction facings carried on opposite sides of said circumferential portion of said member and adapted to be engaged by said surfaces of said assembly, means for urging said plate ring axially in the direction of said first named surface thereby to establish initial frictional driving engagement between said power transmitting assembly and said power transmitting member, and cam means forming a part of said power transmitting assembly associated with said plate ring and a relatively fixed portion of said assembly located adjacent to said plate ring, said cam means being operable to translate rotation of said plate ring with respect to the relatively fixed elements of said assembly into axial thrust applied to said plate ring in the direction of said first named surface.

32. The combination, defined in claim 31, wherein said cam means includes cam surfaces formed on said plate ring on that side thereof remote from said power transmitting member and cam surfaces on said last named relatively fixed element, said cam surfaces being inclined with respect to the plane of rotation of said plate ring.

HOWARD J. MURRAY.

CERTIFICATE OF CORRECTION.

Patent No. 2,096,645.   October 19, 1937.

HOWARD J. MURRAY.

It is hereby certified that the above numbered patent was erroneously issued to "Sure Shift Transmission Corporation, of Pittsburgh, Pennsylvania, a corporation of Delaware" whereas said patent should have been issued to Borg-Warner Corporation, of Chicago, Illinois, a corporation of Illinois, as assignee by mesne assignments, as shown by the record of assignments in this office; and that the said Letters Patent should be read with this correction therein that the same may conform to the record of the case in the Patent Office.

Signed and sealed this 7th day of December, A. D. 1937.

Henry Van Arsdale,
(Seal)   Acting Commissioner of Patents.